(12) United States Patent
Dustman

(10) Patent No.: US 12,074,435 B2
(45) Date of Patent: *Aug. 27, 2024

(54) POWER CONTROL SYSTEM (PCS) COMMISSIONING AGENT

(71) Applicant: ASCO Power Technologies, L.P., Florham Park, NJ (US)

(72) Inventor: William J. Dustman, Lexington, NC (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,576

(22) Filed: Apr. 10, 2023

(65) Prior Publication Data

US 2023/0327480 A1 Oct. 12, 2023

Related U.S. Application Data

(63) Continuation of application No. 17/091,148, filed on Nov. 6, 2020, now Pat. No. 11,641,131.

(51) Int. Cl.
*H02J 13/00* (2006.01)

(52) U.S. Cl.
CPC .. *H02J 13/00001* (2020.01); *H02J 13/00002* (2020.01); *H02J 13/00036* (2020.01); *H02J 2310/14* (2020.01)

(58) Field of Classification Search
CPC .......... H02J 13/00001; H02J 13/00002; H02J 13/00036; H02J 2310/14; H02J 9/00;

(Continued)

(56) References Cited

U.S. PATENT DOCUMENTS

| 4,737,955 A | 4/1988 | Walker et al. |
| 7,848,492 B1 | 12/2010 | Zangara et al. |

(Continued)

FOREIGN PATENT DOCUMENTS

| CN | 102323499 | 1/2012 | |
| JP | 2020-134986 | * 8/2020 | ............. G05B 19/05 |

OTHER PUBLICATIONS

EP Search Report for EP Application No. 21205052.0 dated Mar. 28, 2022.

(Continued)

*Primary Examiner* — Robert E Fennema
*Assistant Examiner* — Olvin Lopez Alvarez
(74) *Attorney, Agent, or Firm* — Locke Lord LLP

(57) ABSTRACT

Systems and methods for verifying correct completion of a power control sequence in a switchgear provide a commissioning agent that can automatically verify correct completion of the power control sequence. The commissioning agent includes a sequence verification tool that can initiate performance of a power control sequence in the switchgear and immediately compare the sequence actually performed to the sequence intended to be performed. If the two sequences do not match in order and timing, the verification tool reports the mismatch and identifies the error. In some embodiments, the commissioning agent further includes a log viewer that captures the sequence actually performed in the switchgear and displays the result for viewing. Such an arrangement provides a faster and more reliable way to double-check the system integrity of the switchgear during initial engineering and after factory and/or field modifications.

20 Claims, 19 Drawing Sheets

(58) Field of Classification Search
CPC ............. H02J 3/00; G05B 2219/24039; G05B 2219/24128; G05B 23/0272; G05B 23/0264; G06F 3/048; G06F 11/28
See application file for complete search history.

(56) References Cited

U.S. PATENT DOCUMENTS

| | | | |
|---|---|---|---|
| 8,046,648 | B1 | 10/2011 | Russell |
| 8,335,946 | B2 | 12/2012 | Baltes et al. |
| 9,965,013 | B1 | 5/2018 | McGee et al. |
| 10,776,177 | B2 * | 9/2020 | Semenov .................. G06F 9/52 |
| 2008/0157775 | A1 | 7/2008 | Finney |
| 2012/0256652 | A1 | 10/2012 | Starkell et al. |
| 2018/0238967 | A1 | 8/2018 | Jochum et al. |
| 2020/0310733 | A1 | 10/2020 | Fujimura et al. |
| 2022/0035976 | A1 | 2/2022 | Dustman |

OTHER PUBLICATIONS

Kohler Power Sytems, "Paralleling Switchgear", 2015, pp. 32 downloaded from the internet https://www.kocos.com/fileadmin/download/ACTAS/Brochure/SPA/FL_ACTAS_P260_360_201808_Mexico_SPA.pdf (Year: 2015).

* cited by examiner

| CAgent_IgnoreEvents | |
|---|---|
| ◇ CAgent_IgnoreEvents[0] | 6 |
| ◇ CAgent_IgnoreEvents[1] | 1006 |
| ◇ CAgent_IgnoreEvents[2] | 0 |
| ◇ CAgent_IgnoreEvents[3] | 0 |
| ◇ CAgent_IgnoreEvents[4] | 0 |
| ◇ CAgent_IgnoreEvents[5] | 0 |
| ◇ CAgent_IgnoreEvents[6] | 0 |
| ◇ CAgent_IgnoreEvents[7] | 0 |
| ◇ CAgent_IgnoreEvents[8] | 0 |
| ◇ CAgent_IgnoreEvents[9] | 0 |
| ◇ CAgent_IgnoreEvents[10] | 0 |

FIG. 7

| SEQUENCE_X | | |
|---|---|---|
| SEQUENCE_X_[0] | | ANNOTATIONS |
| SEQUENCE_X[0][0] | 10 | |
| SEQUENCE_X[0][1] | 1001 | Utility 1 not Acceptable |
| SEQUENCE_X[0][2] | 1002 | 52U1 Open |
| SEQUENCE_X[0][3] | 1003 | 52T1 and 52T2 Closed |
| SEQUENCE_X[0][4] | 1004 | Utility 1 Acceptable |
| SEQUENCE_X[0][5] | 1005 | 52T1 and 52T2 Open |
| SEQUENCE_X[0][6] | 5 | 52U1 Closed |
| SEQUENCE_X[0][7] | 4 | Utility 1 not Acceptable |
| SEQUENCE_X[0][8] | 3 | 52U1 Open |
| SEQUENCE_X[0][9] | 2 | ALT1 CB Close Failure |
| SEQUENCE_X[0][10] | 1 | Bus A Feeders Opened |

FIG. 9

| Event Log Viewer | | | 1012 — Newest Row 12 | |
|---|---|---|---|---|
| EVENT LOG FWD | EVENT LOG REV | | | |
| ID ~1002 | ~1004 | Event Text Description ~1006 | (M)M/(D)D /YYYY | (H)H/(M)M /(S)S/(m)(m) |
| 67 | ROW#: 3 | Bus B Feeders Opened | 5142020 | 145047500 |
| 1051 | ROW#: 4 | Utility 1 Acceptable | 5142020 | 145134400 |
| 1057 | ROW#: 5 | Bus A Feeders Closed | 5142020 | 145134400 |
| 1061 | ROW#: 6 | Utility 2 Acceptable | 5142020 | 145134400 |
| 1067 | ROW#: 7 | Bus B Feeders Closed | 5142020 | 145134400 |
| 1052 | ROW#: 8 | 52U1 Closed | 5142020 | 145134600 |
| 1062 | ROW#: 9 | 52U2 Closed | 5142020 | 145134600 |
| 51 | ROW#: 10 | Utility 1 Not Acceptable | 5142020 | 145133800 |
| 52 | ROW#: 11 | 52U1 Open | 5142020 | 145138300 |
| 1056 | ROW#: 12 | 52T1 and 52T2 Closed | 5142020 | 145141700 |

Event Log Viewer — 1000

| ID | | Event Text Description | (M)M/(D)D/YYYY | (H)H/(M)M/(S)S/(m)(m) |
|---|---|---|---|---|
| 51 | ROW#: 10 | Utility 1 Not Acceptable | 5142020 | 145138000 |
| 52 | ROW#: 11 | 52U1 Open | 5142020 | 145138300 |
| 1056 | ROW#: 12 | 52T1 or 52T2 Closed | 5142020 | 145141700 |
| 1051 | ROW#: 13 | Utility 1 Acceptable | 5142020 | 145402600 |
| 56 | ROW#: 14 | 52T1 or 52T2 Open | 5142020 | 145403200 |
| 1052 | ROW#: 15 | 52U1 Closed | 5142020 | 145406600 |
| 51 | ROW#: 16 | Utility 1 Not Acceptable | 5142020 | 145509400 |
| 52 | ROW#: 17 | 52U1 Open | 5142020 | 145509700 |
| 1073 | ROW#: 18 | ALT1 CB Close Failure | 5142020 | 145527000 |
| 57 | ROW#: 19 | Bus A Feeders Opened | 5142020 | 145530300 |

Buttons: EVENT LOG FWD, EVENT LOG REV

1010 — Newest Row: 19

1002 — ID column; 1004 — Event Text Description; 1006 — date; 1008 — time

FIG. 11A

POWER CONTROL SYSTEM (PCS) COMMISSIONING AGENT

CROSS-REFERENCE TO RELATED APPLICATIONS

This application for patent is a continuation of U.S. Application Ser. No. 17/091,148, entitled "Power Control System (PCS) Sequencer" and filed on Nov. 6, 2020, which is incorporated herein by reference in its entirety.

TECHNICAL FIELD

The present disclosure relates generally to systems and methods for commissioning switchgear and particularly to systems and methods for automatically validating a power control sequence during switchgear commissioning.

BACKGROUND

Electrical switchgear generally refers to an assemblage of circuit switching devices, such as circuit breakers, fuses, switches, relays, and the like, that are used to control, protect, and isolate electrical equipment. The circuit switching devices are typically housed together in a metal enclosure commonly referred to as a switchgear. One or more switchgear may then be combined to form a power control system. Such switchgear are usually installed in power distribution stations and substations, as well as medium to large commercial buildings and industrial facilities.

Modern switchgear have highly complex designs with numerous internal and external components and connections that work together. Thus, in most instances, the switchgear needs to undergo a commissioning process before it can be brought online and, indeed, before it leaves the factory floor. The commissioning process thoroughly checks and confirms that the switchgear and the various components therein are working within specified tolerances.

Part of the commissioning process involves performing one or more power control sequences where the switchgear circuit switching devices are turned on and off or off and on, switched, disconnected, toggled, reset, and the like, in a specific order or sequence. A power control sequence can also purposely fail a switching device, such as a circuit breaker, during a sequence in order to verify the switchgear responds properly, for example, by switching to a different power source or backing out of the current sequence. Normally, when a power control sequence is run, commissioning personnel are required to observe the switchgear and manually document step-by-step whether the switchgear has completed the specified power control tasks in the specified order and timing. However, many of these tasks and even entire sequences can pass extremely quickly, such that the commissioning personnel have to run a sequence multiple times before they can be sure the switchgear completed the sequence successfully.

SUMMARY

Embodiments of the present disclosure relate to systems and methods for automatically verifying correct completion of a power control sequence in a switchgear. The methods and systems provide a commissioning agent that includes a sequence verification tool. The verification tool can initiate performance of a sequence in the switchgear and immediately compare the sequence actually performed to the sequence intended to be performed, as stored in one or more sequence tables. If the two sequences do not match in order and timing, the verification tool reports the mismatch and identifies the error. In some embodiments, the commissioning agent further includes a log viewer that captures the sequence actually performed in the switchgear and displays the result for viewing. Such an arrangement provides a faster and more reliable way to double-check the system integrity of the switchgear during initial engineering and after factory and/or field modifications.

In general, in one aspect, embodiments of the present disclosure relate to a switchgear control module. The switchgear control module comprises, among other things, a human machine interface (HMI) and a switchgear controller coupled to the HMI. The switchgear controller has a commissioning agent residing therein that is operable to select a power control sequence to be performed in the switchgear, the power control sequence being composed of a plurality of sequence steps, the sequence steps being defined in at least one sequence table. The commissioning agent is also operable to instruct the switchgear controller to perform the plurality of sequence steps in the switchgear, the switchgear controller recording events resulting from the plurality of sequence steps in an event log. The commissioning agent is further operable determine a starting position and an ending position in the event log where the events resulting from the plurality of sequence steps were recorded. The commissioning agent is still further operable to perform a verification of the events recorded between the starting position and the ending position in the event log against events in the at least one sequence table corresponding the plurality of sequence steps, and visually highlight any event mismatch identified by the verification on the HMI.

In general, in another aspect, embodiments of the present disclosure relate to a method of verifying performance of a power control sequence in a switchgear. The method comprises, among other things, selecting a power control sequence to be performed in the switchgear, the power control sequence being composed of a plurality of sequence steps, the sequence steps being defined in at least one sequence table. The method also comprises instructing a switchgear controller to perform the plurality of sequence steps in the switchgear, the switchgear controller recording events resulting from the plurality of sequence steps in an event log. The method further comprises accessing the event log in the switchgear controller, the event log residing at a designated location in the switchgear controller. The method still further comprises determining a starting position and an ending position in the event log where the events resulting from the plurality of sequence steps were recorded, and performing a verification of the events recorded between the starting position and the ending position in the event log against events in the at least one sequence table corresponding the plurality of sequence steps. Any event mismatch identified by the verification is visually highlighted on a display device.

In general, in yet another aspect, embodiments of the present disclosure relate a switchgear. The switchgear comprises, among other things, at least one circuit switching device and a switchgear control module coupled to the at least one circuit switching device. The switchgear control module has a switchgear controller therein that is programmed to select a power control sequence to be performed in the switchgear, the power control sequence being composed of a plurality of sequence steps, the sequence steps being defined in at least one sequence table. The switchgear controller is also programmed to perform the plurality of sequence steps in the switchgear, and record events resulting from the plurality of sequence steps in an event log, the event log residing at a designated location in the switchgear controller. The switchgear controller is further programmed to determine a starting position and an ending position in the event log where the events resulting from the plurality of sequence steps were recorded, and perform a verification of the events recorded between the starting position and the ending position in the event log against events in the at least one sequence table corresponding the plurality of sequence steps. Any event mismatch identified by the verification is visually highlighted on the HMI.

In accordance with any one or more of the foregoing embodiments, the verification is performed after the switchgear controller completes performance of the plurality of sequence steps of the power control sequence, and/or the verification is performed on a step-by-step basis as the switchgear controller completes each sequence step of the plurality of sequence steps.

In accordance with any one or more of the foregoing embodiments, an actual event and an expected event that caused the event mismatch identified by the verification is displayed on the HMI, and/or a position in the event log where the event mismatch occurred for the event mismatch identified by the verification is displayed on the HMI.

In accordance with any one or more of the foregoing embodiments, the at least one sequence table specifies a timing delay for at least one sequence step, and a verification is performed that the timing delay specified by the at least one sequence table was performed by the switchgear controller for the at least one sequence step.

In accordance with any one or more of the foregoing embodiments, the switchgear controller is automatically instructed to perform a plurality of sequence steps for at least one additional power control sequence in the switchgear.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 7 illustrates an exemplary sequence table for events to be ignored according to embodiments of this disclosure;

FIG. 9 illustrate an alternative sequence table having event annotations according to embodiments of this disclosure;

FIGS. 10A-10B illustrate an alternative event log and verification tool user interface according to embodiments of this disclosure;

FIGS. 11A-11B illustrate the alternative event log and verification tool user interface where sequence verification failed due to an incorrect event ID.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
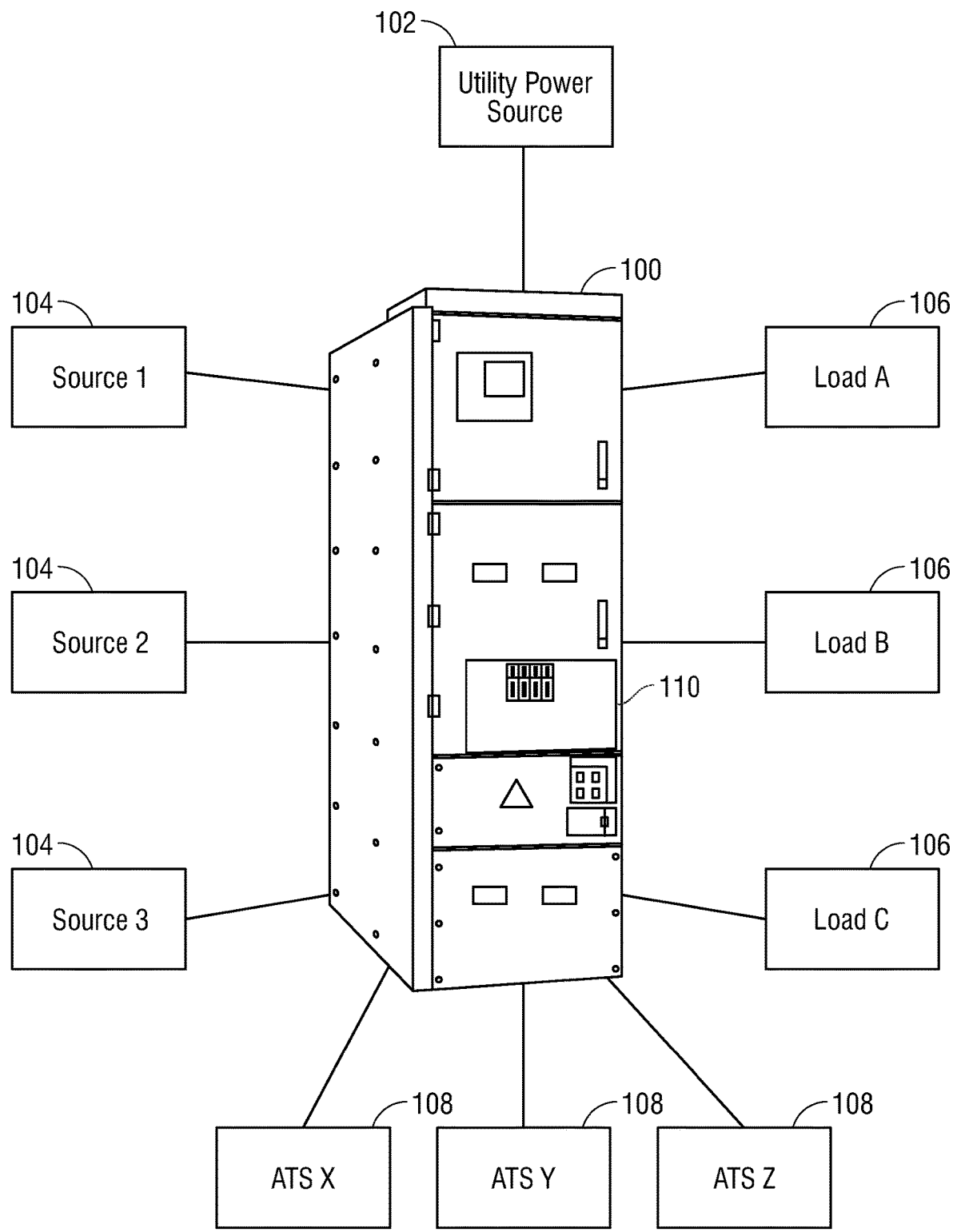
FIG. 1 illustrates a schematic diagram for an exemplary switchgear having a commissioning tool according to embodiments of this disclosure.

Referring now to FIG. 1, an exemplary switchgear 100 is shown having automatic power control sequence verification capability according to embodiments of the present disclosure. The switchgear 100 may be any switchgear known to those skilled in the art used to control, protect, and isolate electrical equipment in power distribution stations as well as medium to large commercial buildings and industrial facilities (not expressly shown). In some embodiments, the switchgear 100 may be a medium or low voltage switchgear, such as any of the MV or LV series of switchgear available from Schneider Electric USA, Inc. One or more of such switchgears, including switchgears dedicated to power generation, control, and distribution, may be combined to form a power control system (PCS).

A utility power source 102 is connected to the switchgear 100 to provide main power to the switchgear 100. In some embodiments, the utility power source 102 provides a medium voltage, such as about 13.5 kilovolts or 12.8 kilovolts at a frequency of about 60 Hz. One or more backup power sources 104, labeled here as Source 1, Source 2, Source 3, are also connected to the switchgear 100 to provide backup power when the utility power source 102 is lost. These backup sources 104 may include, for example, one or more backup generators, solar power generators, wind power generators, uninterruptible power supplies (UPS), alternative utility sources, and the like. The generators 104 and the utility power source 102 provide electrical power to various loads 106 connected to the switchgear 100, such as computing equipment, processing equipment, lighting equipment, environmental control equipment, and the like, labeled here as Load A, Load B, Load C. The switchgear 100 is also connected to one or more automatic transfer switches (ATS) 108, labeled here as ATS X, ATS Y, ATS Z, that operate to connect the various loads 106 to the backup sources 104 when the utility power source 102 is lost.

A switchgear control module 110 is mounted on the switchgear 100, for example, on a front panel thereof. The switchgear control module 110 operates to control, protect, and isolate the various loads 106. Among other things, the switchgear control module 110 automatically switches one or more of the loads 106 from the utility power source 102 to the backup generators 104 when main power is lost. Users may also enter commands in the switchgear control module 110 to manually operate the switchgear 100. For example, users may instruct the switchgear control module 110 to initiate one or more power control sequence as part of commissioning the switchgear 100. To this end, the switchgear control module 110 is equipped with a commissioning agent that can be run to automatically verify correct completion of a power control sequence in the switchgear 100.

Figure 2:
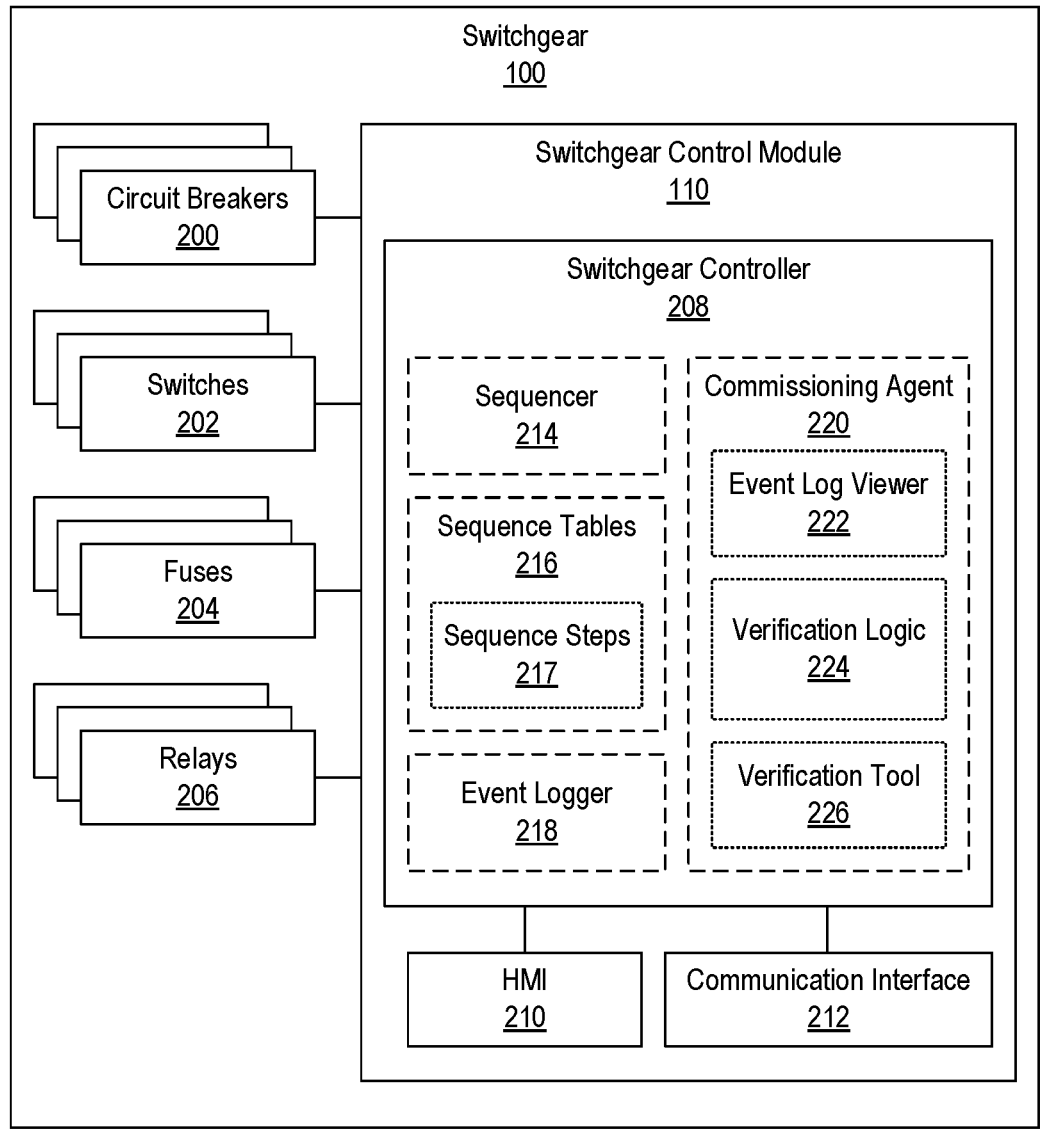
FIG. 2 illustrates a block diagram for an exemplary switchgear sequencer having a commissioning tool according to embodiments of this disclosure.

FIG. 2 shows a more detailed view of the switchgear 100 according to embodiments of the present disclosure. As can be seen, the switchgear 100 houses a plurality of circuit switching devices, such as one or more circuit breakers 200, switches 202, fuses 204, relays 206, and the like. These circuit switching devices are connected to and controlled by the switchgear control module 110 to protect and isolate any electrical equipment connected to the switchgear 100. In particular, a switchgear controller 208 in the switchgear control module 110 has programming that opens or closes, turns on or off, and/or connects or disconnects one or more of the circuit switching devices. This may be done, for example, when the switchgear control module switches power from one power source to another, adds a load to a power source due to surplus source capacity, or removes a load from a power source due to source over capacity. A human machine interface (HMI) 210, which may be a touchscreen or other type of display, is coupled to the switchgear controller 208 to facilitate user control of and interaction with the switchgear controller 208. A communication interface 212, which may be a wired and/or wireless communication interface, is coupled to the switchgear controller 208 to facilitate communication with an external system (e.g., remote HMI, control room, SCADA system, etc.).

The switchgear controller 208 is also programmed or otherwise stores programming that controls various aspects of the switchgear 100. Any suitable switchgear controller may be used as the switchgear controller 208, such as any of the switchgear controllers available from Schneider Electric USA, provided it has sufficient computing capacity for the purposes herein. Among the programming in the switchgear controller 208 are several operational components, including a sequencer 214, one or more sequence tables 216, and an event logger 218. These components operate together in the switchgear controller 208 in a known manner to provide power control sequence functionality that can be used to perform commissioning of the switchgear 100.

In addition to the above operational components 214, 216, 218, the switchgear controller 208 is also programmed or otherwise stores programming for a commissioning agent 220. The commissioning agent 220 is designed to leverage the existing power control sequence functionality in the switchgear controller 208 to automatically initiate a power control sequence in the switchgear 100 and immediately verify whether the sequence was performed correctly. To accomplish this feature, the commissioning agent 220 uses several subcomponents, including an event log viewer 222, sequence verification logic 224, and a sequence verification tool 226, among other components.

The sequencer 214, when commanded by the switchgear controller 208, runs one or more specified power control sequences that are intended to test whether the switchgear 100 is operating as designed. The one or more power control sequences to be run may be specified by programming residing in the switchgear controller 208 or they may be manually entered by the user (via the HMI 210). In a typical implementation, the sequencer 214 looks up or obtains these one or more power control sequences from the one or more sequence tables 216. Each sequence table 216 has a listing or sequence of steps 217 that follow a given data structure and, depending on the specific table, a list of event IDs or a list of event timing delays, that defines the power control sequence. The sequencer 214 accesses the one or more sequence tables 216, finds the specified sequence, and carries out the steps 217 set forth in the sequence. The event logger 218 generally records every event that occurs in the switchgear 100, including the steps 217 of any power control sequence run by the sequencer 214, and stores these events in an event log.

A simplified example of a power control sequence may include the following steps: 1) close the circuit breaker connecting the backup generator, 2) open the switch connecting the UPS, and 3) disconnect the relay connecting the load, in that order. These sequences are usually performed during commissioning of the switchgear 100 prior to shipping from the factory and again during initial installation on-site. A sequence may be rerun after initial installation if needed, for example, when modifications are made to the switchgear after initial installation and testing.

For purposes herein, the "events" that are recorded by the event logger 218 refer to any transition by one of the circuit switching devices (e.g., circuit breakers 200, switches 202, fuses 204, relays 206, etc.) or other devices in the switchgear 100. Thus, for example, each device transition from OFF to ON, or ON to OFF, or OPEN to CLOSE, or CLOSE to OPEN, and so forth, constitutes an "event" that is recorded by the event logger 218 in an event log. These events can also include power sources, such as generators and utility services, turning ON or OFF via the circuit switching devices (e.g., circuit breakers).

In accordance with embodiments of the present disclosure, the commissioning agent 220 is configured to initiate (or be used to initiate) a power control sequence in the switchgear controller 208. The commissioning agent 220 does this by issuing (or causing issuance of) an appropriate command or instruction to the sequencer 214 in a known manner. The commissioning agent 220 then reads the event log for the sequence as recorded by the event logger 218, and checks the steps therein against the steps 217 of the corresponding sequence stored in the sequence tables 216. More specifically, the event log viewer 222 of the commissioning agent 220 accesses a designated memory or storage location where the event logger 218 stores the event log and extracts or copies the steps recorded there. The event log viewer 222 can then display the extracted sequence steps for user viewing (e.g., on HMI 210, a SCADA system, etc.) and provide the steps to other components in the commissioning agent 220. The extracted sequence steps are thereafter compared by the verification logic 224 to the steps 217 of the corresponding sequence in the sequence tables 216 to determine whether they match. If there is any mismatch, the verification logic 224 identifies the mismatch and reports it to the verification tool 226. The verification tool 226 then displays the identified mismatch for user review and can also display any associated annotation that may be available. A user can also use the verification tool 226 to select and manually run specific sequences from the sequence tables 216 as part of a commissioning procedure.

In some embodiments, the switchgear controller 208 is a type of controller that employs a sequence of event recorder to perform the function of the event logger 218. The sequence of event recorder typically has inputs that record each transition of a circuit switching device from OFF to ON or ON to OFF, OPEN to CLOSE or CLOSE to OPEN, and so forth. Each transition is assigned a separate event ID and recorded in a separate row of an internal event table (e.g., "EVENTLOG") that serves as an event log for the controller 208. The timing of that transition is also recorded in the same row of an internal timing table (e.g., "EVENTLOG_TIME"), typically in HH:MM:SS:mm format, where "H" stands for hours, "M" minutes, "S" seconds, and "m" milliseconds. The date of the transition is likewise recorded in the same row of an internal date table (e.g., "EVENTLOG_DATE"), typically in a MM:DD:YYYY format, where "M" stands for month, "D" for day, and Y for year. An internal row pointer (e.g., "EVENTLOG_PTR") points to the current row in the internal event table where a new event ID is to be written. When the last row in the internal event table is reached, the pointer wraps around back to the first row of the table.

Figure 3:
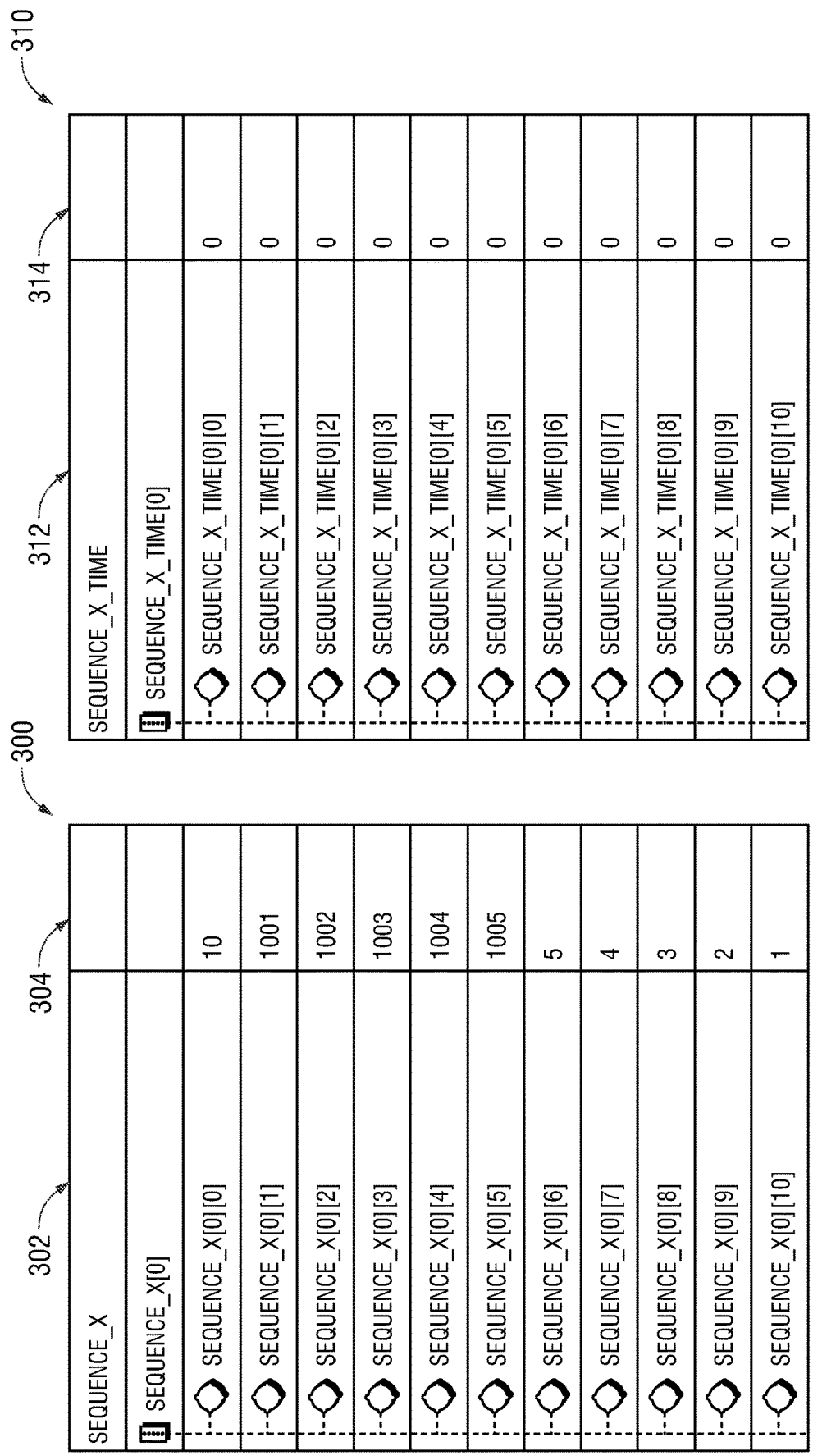
FIG. 3 illustrates exemplary sequence tables according to embodiments of this disclosure.

FIG. 3 shows an example of the one or more sequence tables 216 (and steps 217) commonly implemented in switchgear controllers like the switchgear controller 208 to define a power control sequence. The sequence tables 216 are typically stored in or may be downloaded to a designated storage location or memory block in the switchgear controller 208. As alluded to above, the switchgear controller 208 is a type of controller that uses at least two sequence tables 216, a sequence event table 300 and a sequence timing table 310, to store each power control sequence. In this example, the first row in each table 300, 310 specifies whether the table is a sequence table (e.g., "SEQUENCE_X") or a timing table (e.g., "SEQUENCE_X_TIME"), while the second row specifies the sequence number (e.g., "0") that the switchgear controller 208 can use to identify the specific power control sequence defined by the tables 300, 310.

The sequence event table 300 has two lists, a sequence list 302 that specifies the number and order of the steps in the power control sequence, and an event ID list 304 that specifies the events to be performed at each step. In the FIG. 3 example, there are 10 steps in the sequence list 302, hence 10 event IDs, with the zeroth step (step 0) specifying the total number of steps in the power control sequence (10 steps). The event IDs here use a convention where each circuit switching device is represented by a different number (e.g., 1, 2, 3, 4, 5) and each transition of that device is represented by that number offset by 1000. Thus, in step 1, event ID "1001" (first row) indicates a transition by device 1 from OFF to ON, whereas event ID "1" in step 10 (tenth row) indicates a reverse transition by device 1, and so forth. As can be seen in this example, the sequence event table 300 defines a sequence (sequence number "0") where the devices are turned on in order of 1 to 5, but turned off in the reverse order.

The sequence timing table 310 also has two lists, a sequence list 312 that specifies the same number and order of steps in the sequence as the sequence list 302, and a timing delay list 314 that specifies the delay time (e.g., in seconds) between each step. In the current example, no delay times are specified and thus the timing delay list 314 is empty or populated with zeroes by default.

Figure 4A:
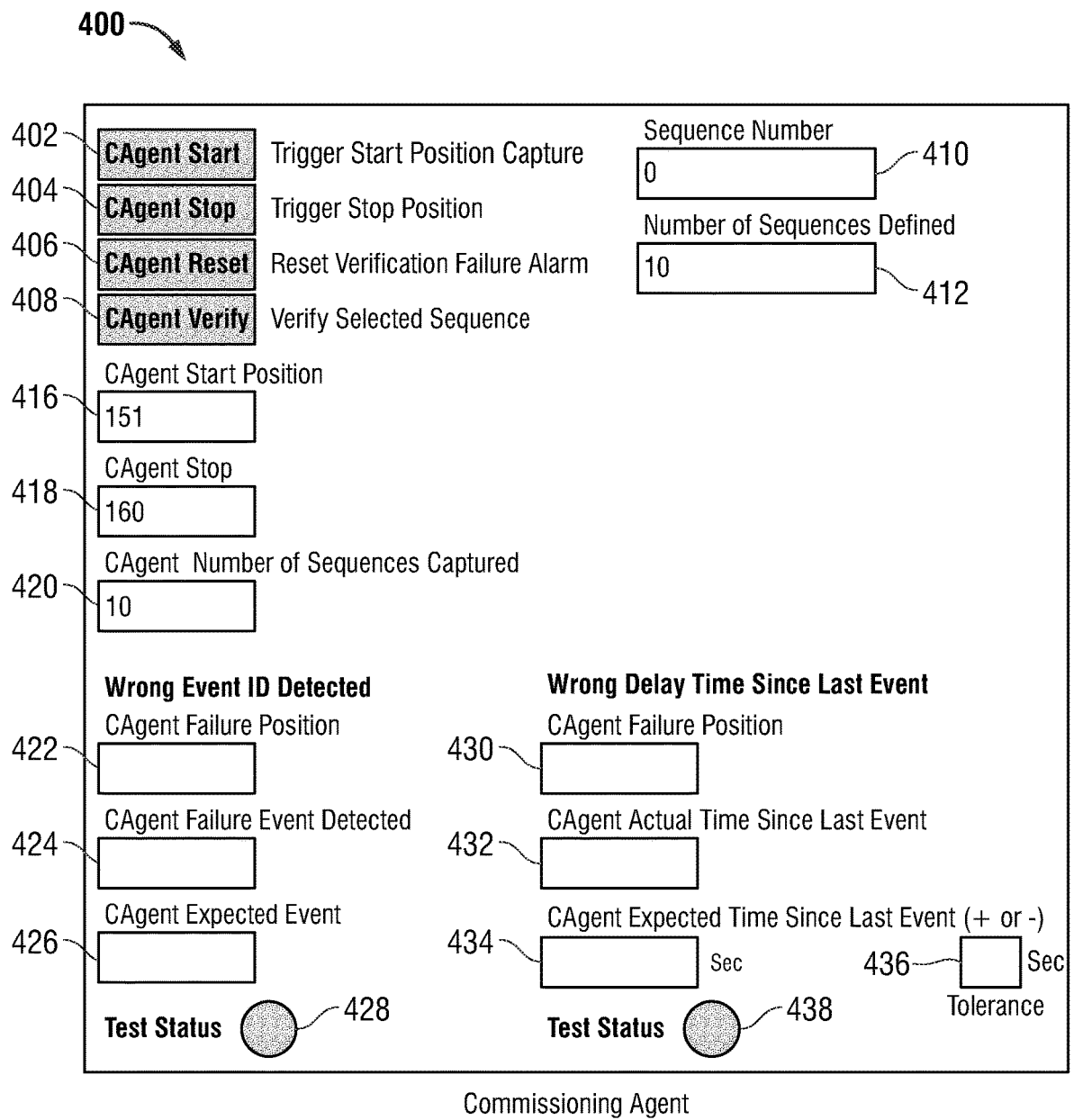
FIGS. 4A-4C illustrate an exemplary verification tool user interface and an exemplary event log viewer according to embodiments of this disclosure.

Referring now to FIG. 4A, an exemplary verification tool user interface 400 is shown representing one implementation of the verification tool 226 of the commissioning agent 220 (FIG. 2). A user may use this user interface 400 to initiate a power control sequence in the switchgear controller 208 and immediately verify whether the sequence steps were completed correctly. The exemplary user interface 400 includes a Start button 402, Stop button 404, Reset button 406, and Verify button 408. A Sequence Number field 410 allows the user to choose a specific power control sequence to initiate by entering the sequence number for that sequence. Doing so automatically populates a Number of Sequences Defined field 412 with the number of steps specified in the selected sequence.

Pressing the Start button 402 captures (via the event logger 222) the row number in the internal event table ("EVENTLOG") currently being pointed to by the internal row pointer ("EVENTLOG_PTR"). The captured row number is provided to the user interface 400 (via the event logger 222), which populates that row number in a Start Position field 416. The Start button 402 also launches the selected power control sequence (via the sequencer 214), which runs automatically until all steps in the sequence are completed. The event ID for the first step in the sequence is recorded in the current row, the event ID for the next step is recorded in the next row, and so forth, until the total number of steps in the selected sequence have been completed.

Completion of the sequence steps automatically captures (via the event logger 222) the row number in the internal event table where the last step in the sequence is recorded (e.g., EVENTLOG_PTR−1). It is of course also possible for the event logger 222 to determine the row number where the last step is (or will be) recorded by simply adding the total number of steps in the sequence (as defined in sequence event table 300) to the row number in the Start Position field 416. In either case, the user interface 400 then populates a Stop Position field 418 with that last step row number. A Number of Sequence field 420 displays the difference between the start position row number and the stop position row number. The power control sequence may also be manually stopped if desired (e.g., to perform only part of the sequence) by manually pressing the Stop button 404.

In the FIG. 4A example, the starting row number in the internal event table where the power control sequence was recorded is 151, and the ending row number is 160, reflecting a total of 10 steps processed, as indicated by the Number of Sequence field 420. This field 420 should match the number in the Number of Sequences Defined field 412. A mismatch between these two fields could indicate the sequence steps failed to complete correctly. When a failure is detected, the row number for the event ID in the step that caused the failure populates a Failure Position field 422, the incorrect event ID populates a Failure Event Detected field 424, and the expected or correct event ID populates an Expected Event field 426. In some embodiments, a Test Status indicator 428 may be included in the user interface 400 to provide a visual indication of the event test status. In a similar manner, if there was a timing delay error in any the sequence steps, the row number for the event ID in the step that caused the timing failure populates a Timing Failure Position field 430, the incorrect timing delay populates an Actual Time Since Last Event field 432, and the expected timing delay populates an Expected Since Last Event field 434. Where the sequence includes timing delays, the user may specify a timing tolerance (e.g., in seconds) for the selected sequence in a Timing Tolerance field 436. In some embodiments, a second Test Status indicator 438 may be included to provide a visual indication of the timing delay test status.

Figure 4B:
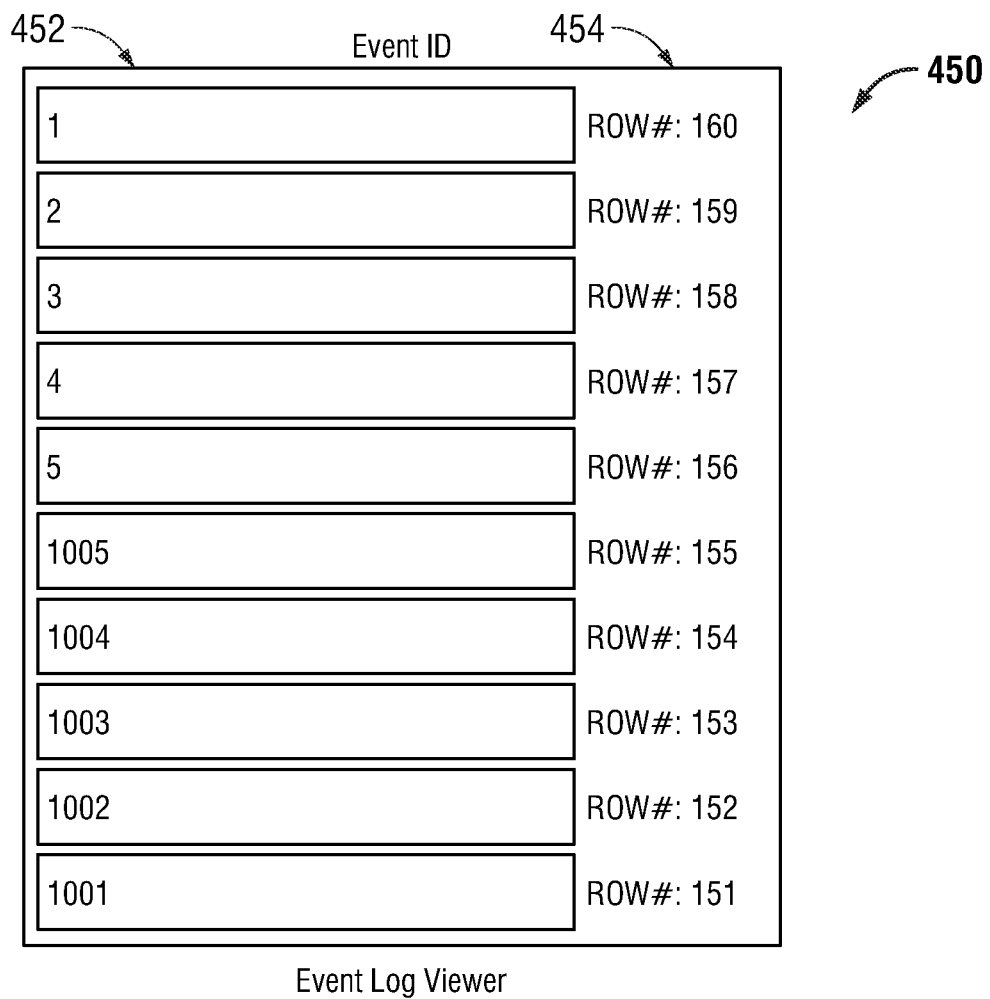

FIG. 4B shows an exemplary event log 450 as extracted by the event log viewer 222 (FIG. 2) from the internal event table mentioned above. The event log 450 in this example includes two lists, an event ID list 452 containing the event IDs that were recorded for each step of the selected sequence, and a row number list 454 containing the row numbers where the event IDs were recorded in the internal event table. In some embodiments, the event log viewer 222 may wait until all the sequence steps are completed, then obtain the entire event ID list 452 and row number list 454 for the selected sequence in one reading or one extraction (from the internal event table). In other embodiments, the event log viewer 222 may obtain the event ID list 452 and row number list 454 on a step-by-step basis in real time as each step is completed. In either case, event IDs in the event log 450 should match the event IDs in the sequence event table 300 (FIG. 3) for the selected sequence if the switchgear is operating as intended.

Figure 4C:
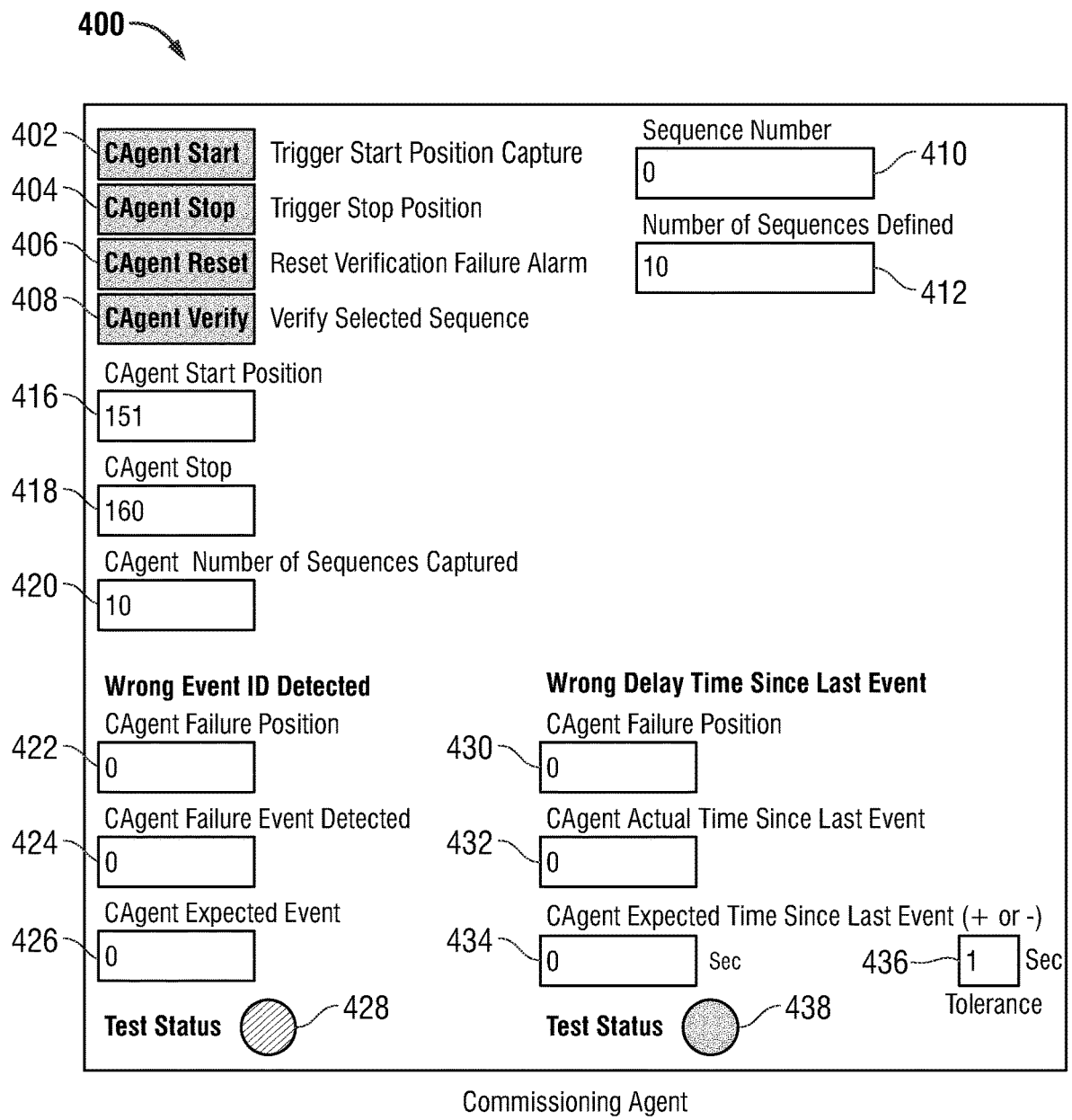

FIG. 4C shows the verification tool user interface 400 after the Verify button 408 was pressed. Pressing this button 408 causes the verification logic 224 to begin comparing the event IDs in the sequence event table 300 and the event IDs in the event log 450 extracted from the internal event table. Depending on the implementation, the verification logic 224 may perform the verification on all the event IDs at once or on a step-by-step basis in real time as each step is completed. Regardless, if there is any mismatch between the event IDs in the sequence event table 300 and the event log 450, then the user interface 400 populates the failure event ID fields 422, 424, 426 accordingly. There are no mismatches in the present example, so those fields are populated with zeros by default, and the event Test Status indicator 428 is green-lit or otherwise visually highlighted to reflect successful completion of the sequence steps.

Figure 5A:
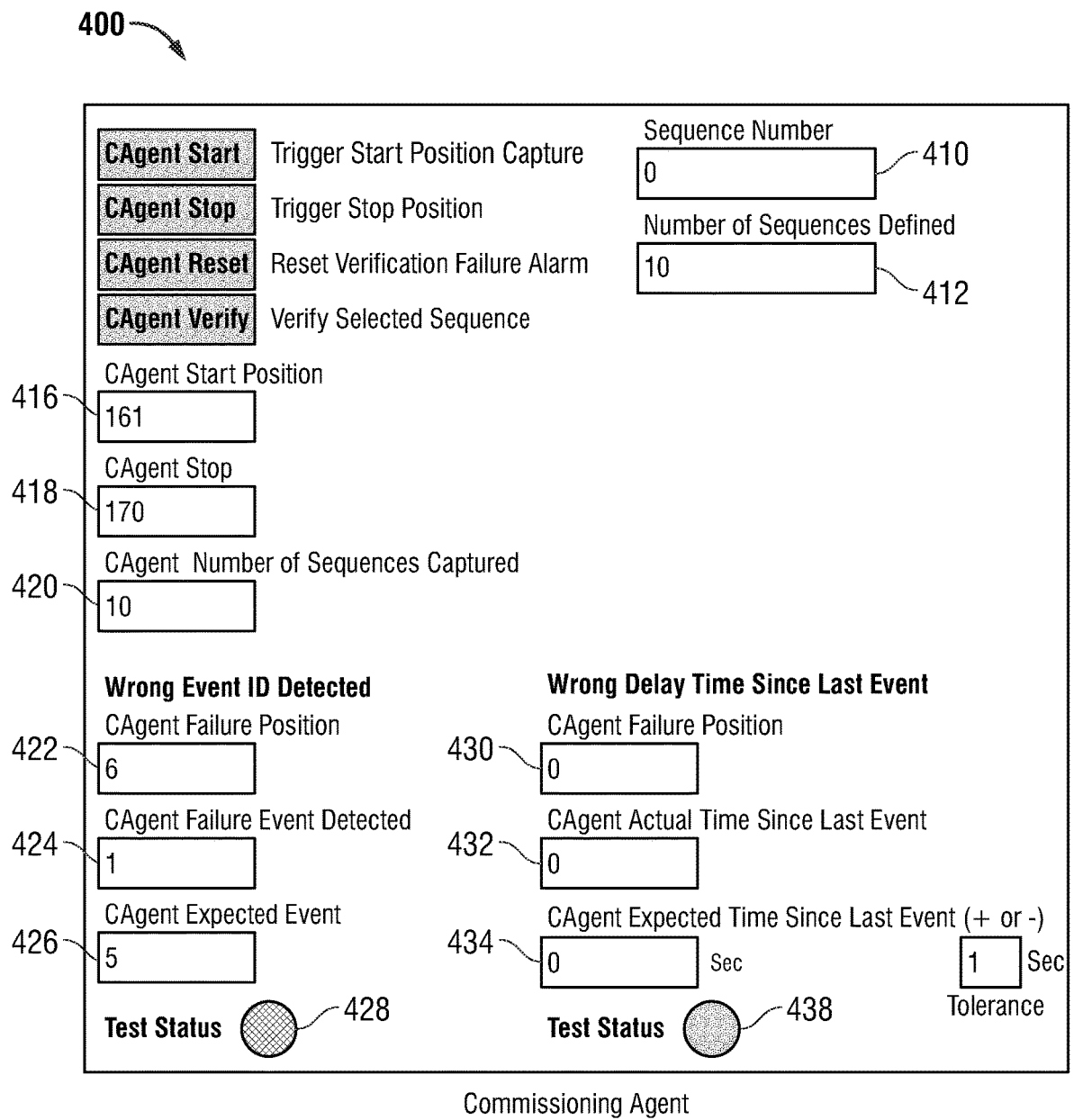
FIGS. 5A-5B illustrate the exemplary verification tool user interface and event log from FIGS. 4A-4C where sequence verification failed due to an incorrect event ID.
Figure 5B:
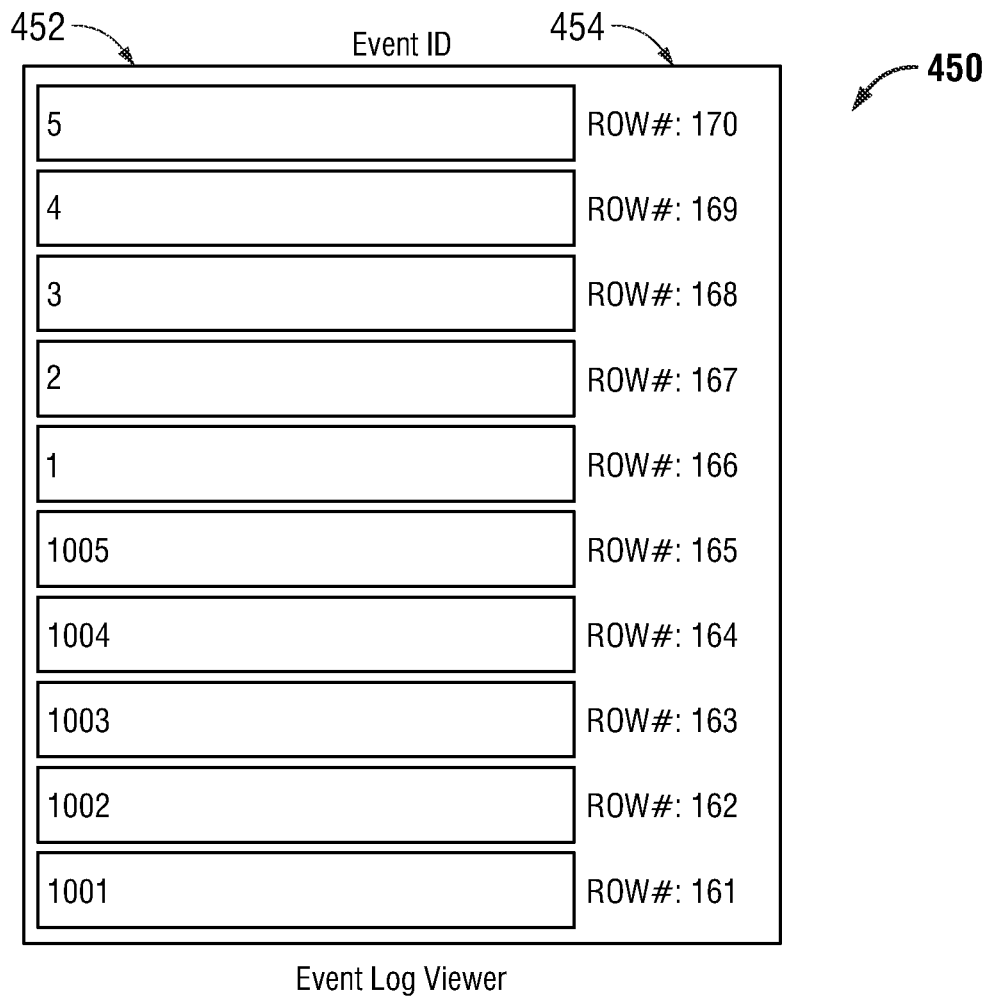

FIGS. 5A-5B show the same verification tool user interface 400 and event log 450 from FIGS. 4A-4B, but for illustrative purposes, the verification here was made to fail or not pass by inserting an incorrect event ID for the selected sequence. As the event log 450 shows, the sequence turned off devices 1 to 5 in the same order they were turned on instead of in the reverse order, as specified in the sequence event table 300. This order reversal caused a mismatch starting at the sixth row, or row number 166, from where the sequence steps began to be recorded in the internal event table. The user interface 400 accordingly populates the Failure Position field 420 with the number "6" in FIG. 5A. The event ID that caused the failure is "1," so the user interface 400 populates the Failure Event Detected field 424 with the number "1." The event ID that was expected is "5," so the user interface 400 populates the Expected Event field 426 with the number "5." In some embodiments, the event Test Status indicator 428 is red-lit or otherwise highlighted to indicate the unsuccessful completion of the sequence steps.

Figure 6A:
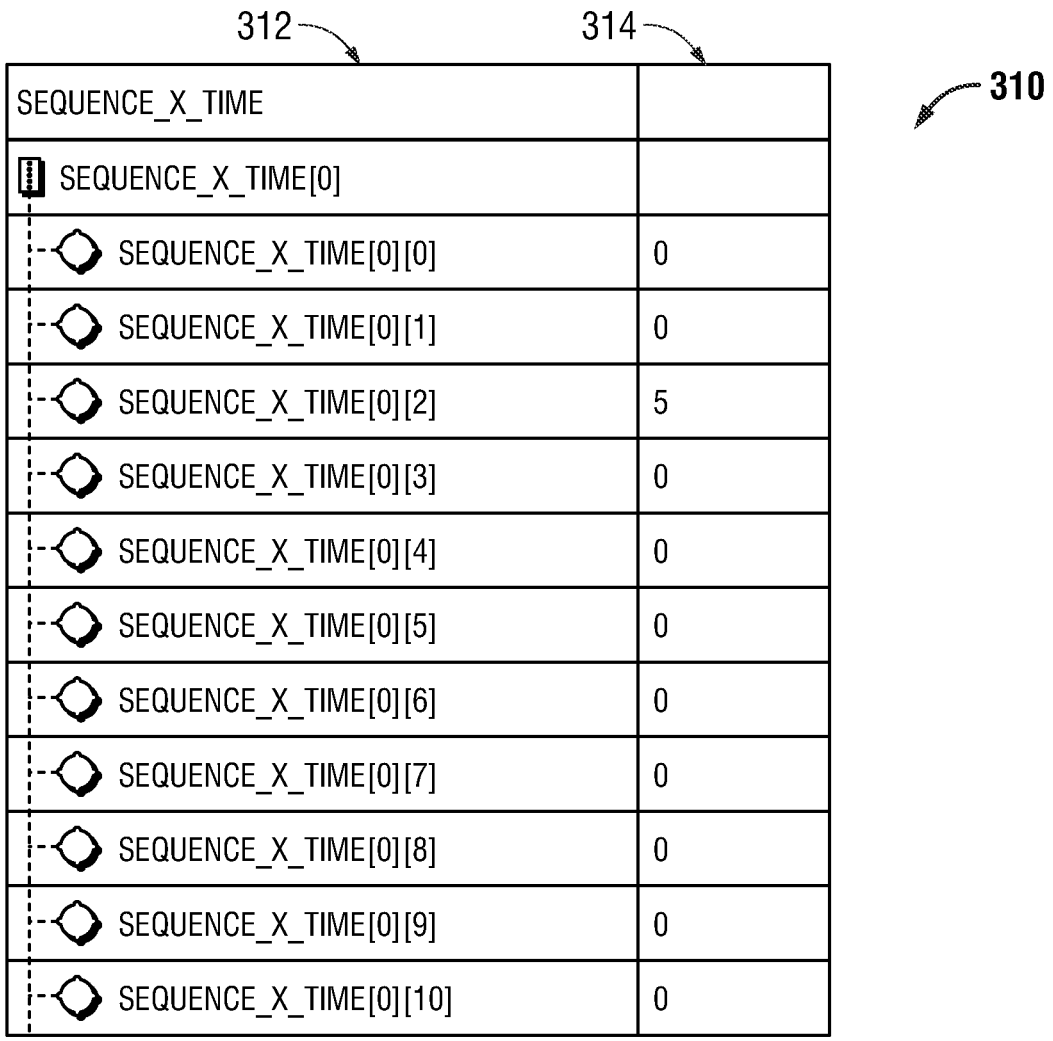
FIGS. 6A-6B illustrate the exemplary verification tool user interface and event log from FIGS. 4A-4C where sequence verification failed due to an incorrect timing delay.
Figure 6B:
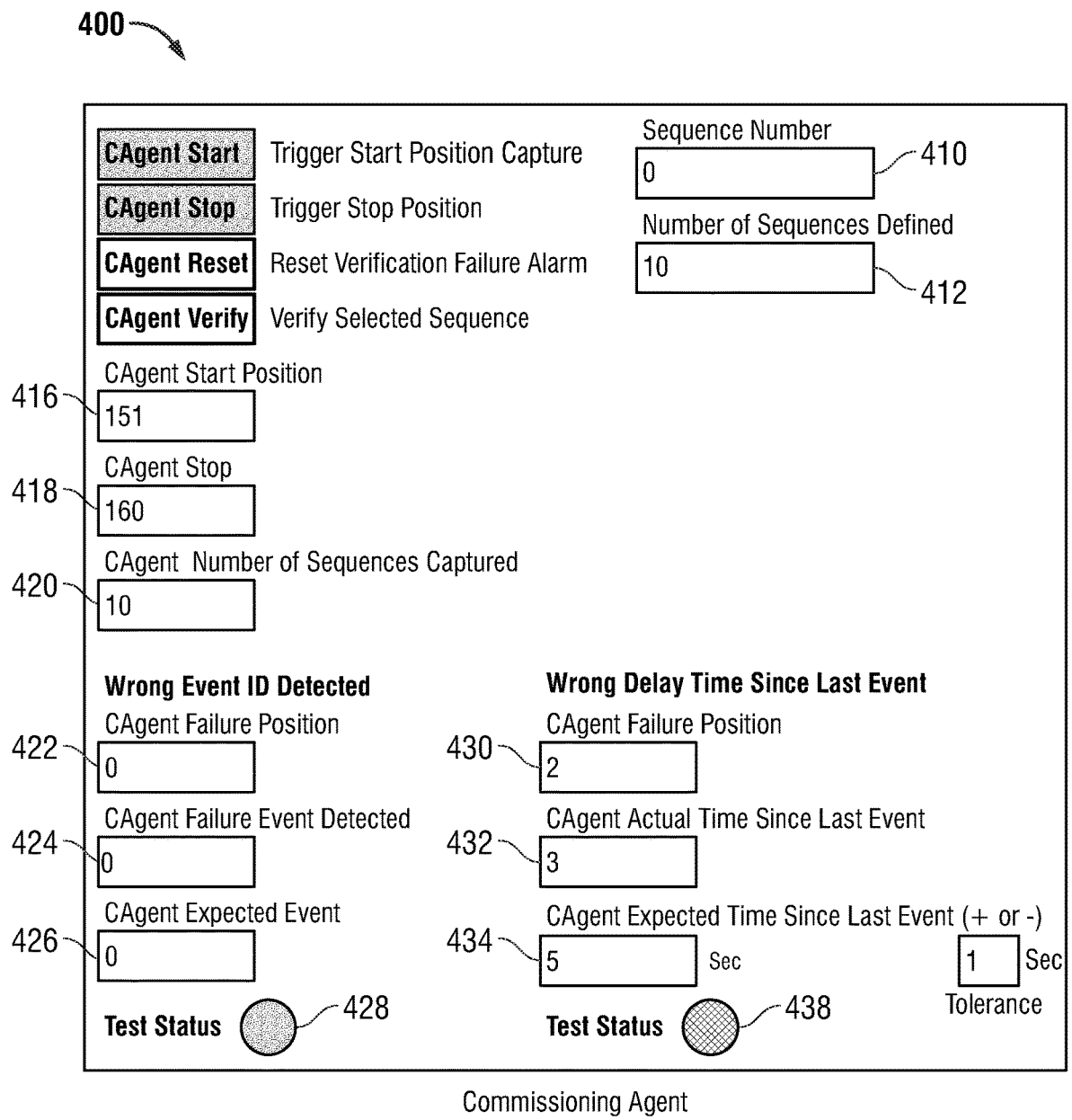

FIG. 6A shows the sequence timing table 310 from FIG. 3 again, but for illustrative purposes, a time delay of 5 seconds was specified at the second step. FIG. 6B shows the verification tool user interface 400 from FIG. 4A again, but with a failed or non-passing verification due to an incorrect timing delay at the second step. As can be seen, a timing delay discrepancy occurred at the second row from where the sequence steps began to be recorded in the internal event table. The user interface 400 accordingly populates the Failure Position field 430 with the number "2." The event at that second step was performed only 3 seconds after the previous event (instead of 5 seconds), so the user interface 400 populates the Actual Time field 432 with the number "3." The event was expected to occur 5 seconds after the previous event, so the user interface 400 populates the Expected Time field 434 with the number "5." In some embodiments, the delay Test Status indicator 436 is red-lit or otherwise highlighted to indicate the unsuccessful completion of the sequence steps.

FIG. 7 shows an exemplary ignore events table 700 that may be used to inform the commissioning agent 220 that certain events may be ignored in the power control sequence. The ignore events table 700 has two lists, an index list 702 that serves simply to enumerate events that are to be ignored in the sequence, and an events to be ignored list 704 that specifies the event IDs that may be ignored or skipped if found. These events may be events that can occur somewhat randomly in a working switchgear and are not necessarily failures, but events that may occur in any order in the switchgear. For example, the timing of a specific generator starting or coming online cannot always be predicted with precision. Such an event is still recorded (via the sequence of events recorder of the switchgear controller 208), but it may get recorded out of sequence. The ignore events table 700 allows the commissioning agent 220 to ignore any such "random" events if they get recorded by the sequence of events recorder. In the example shown, there are 2 events that may be ignored if either is found, event ID "6" and event ID "1006."

Figure 8A:
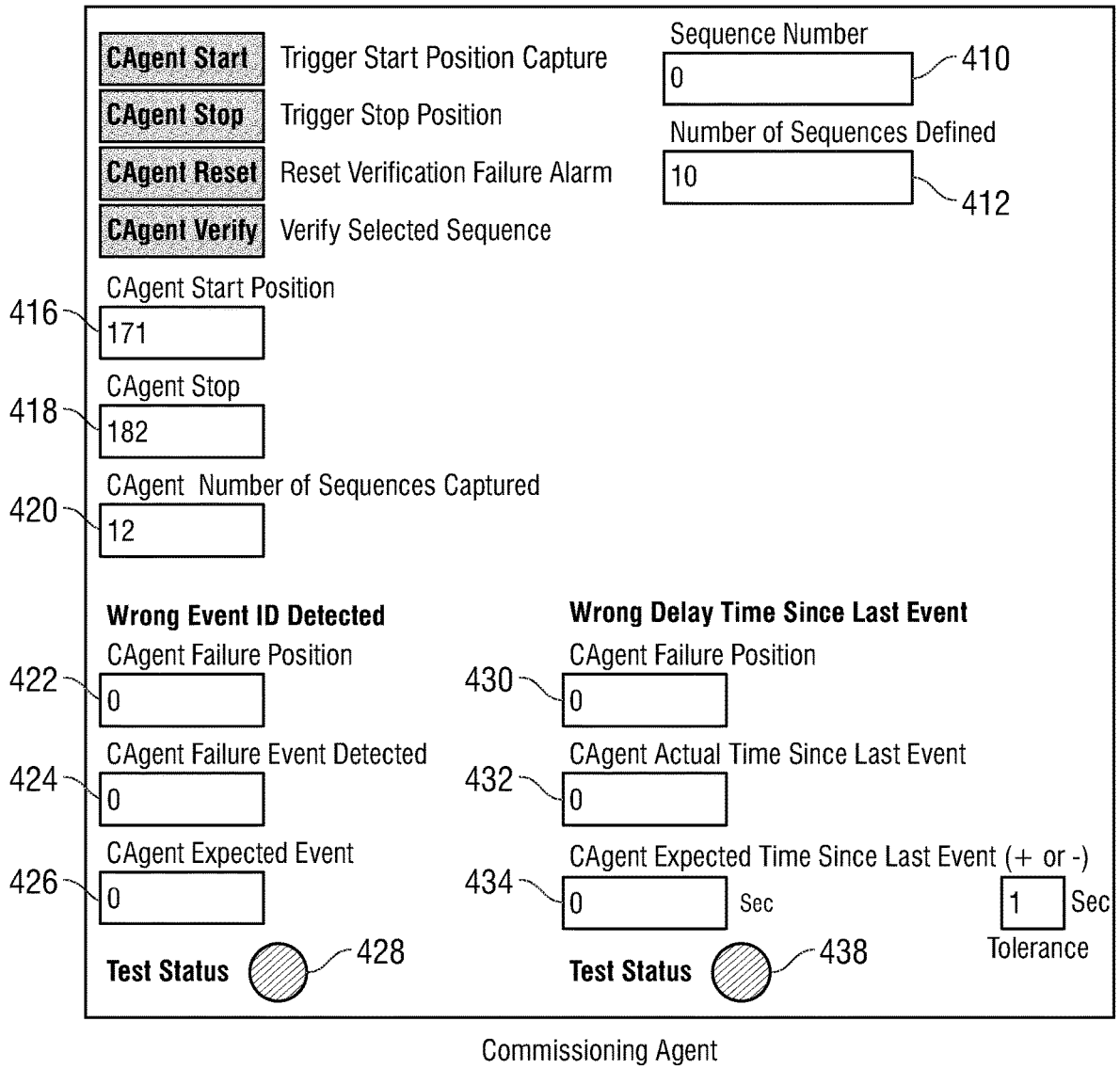
FIGS. 8A-8B illustrate the exemplary verification tool user interface and event log from FIGS. 4A-4C where sequence verification passed due to an ignored event ID.
Figure 8B:
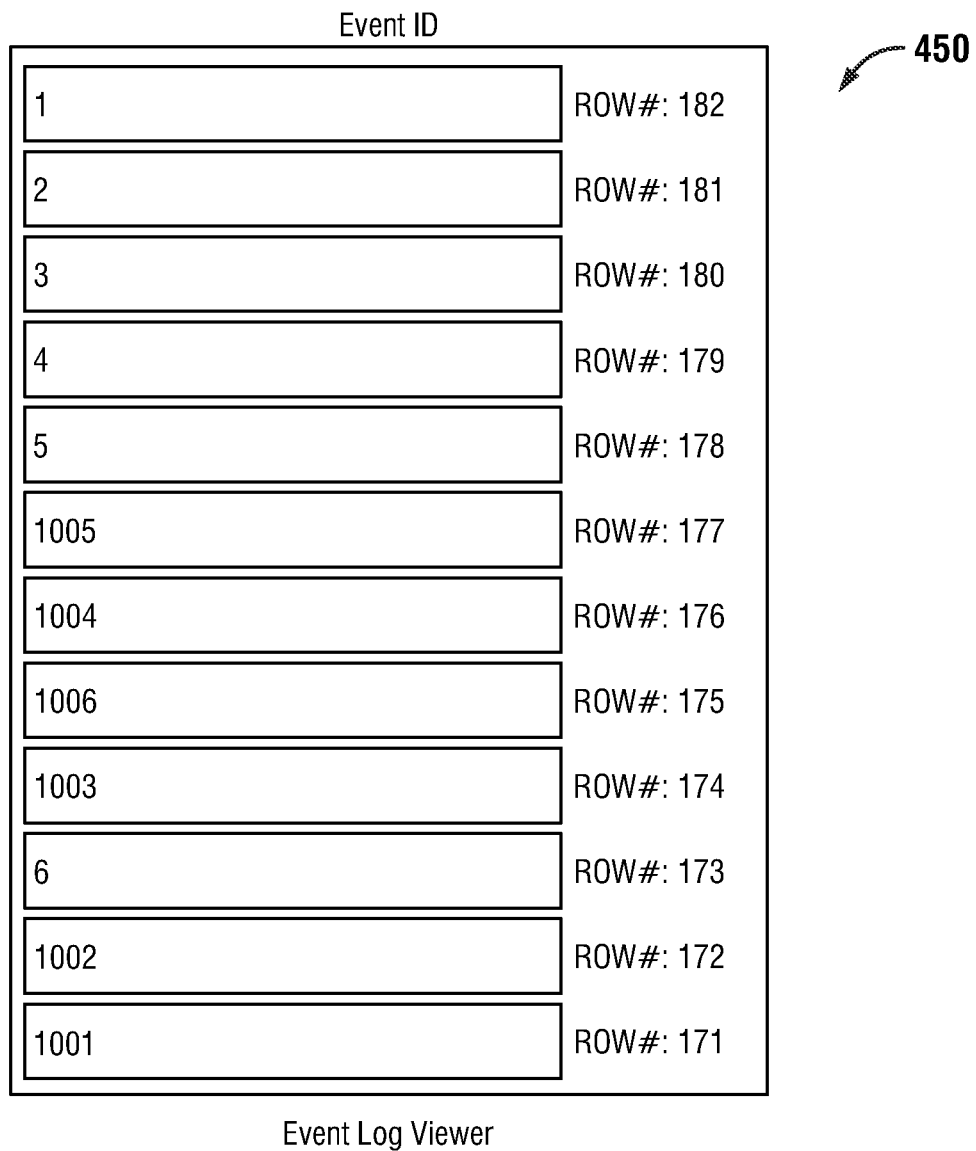

FIGS. 8A-8B show the same verification tool user interface 400 and event log 450 from FIGS. 4A-4B, but this time the definition of the power control sequence includes the ignore events table 700 from FIG. 7 in addition to the sequence event table 300 from FIG. 3. As can be seen in the event log 450, event ID "6" and event ID "1006" occurred unexpectedly during the running of the sequence. These event IDs were recorded at the third row and fifth row, respectively, in the internal event table (via the sequence of events recorder), which caused the event log 450 to have a total of 12 event IDs instead of the expected 10 (per sequence event table 300). The number of event IDs ("12") is populated in the Number of Sequences Captured field 420 in the user interface 400 and would normally cause a mismatch (via the verification logic 224). However, because event ID "6" and event ID "1006" are included in the ignore events table 700, these events are skipped and verification is performed only on the remaining event IDs. The user interface 400 can accordingly indicate successful completion of the sequence steps.

FIG. 9 shows an example of a sequence table 900 in which annotations have been provided for the event IDs listed in the table. The sequence table 900 is similar to the sequence event table 300 from FIG. 3 insofar as there is a sequence list 902 that specifies the number and order of the steps in the sequence, and an event ID list 904 that specifies the events to be performed at each step. In addition, a list of annotations 904 is included for the event IDs that provide users with a shorthand description or context for the events. Thus, for example, event ID "1001" in the first row indicates a transition of device 1 from OFF to ON. The annotation for this first row explains that event ID "1001" is intended to remove utility power ("Utility 1") from the switchgear when there is a main power outage. Similarly, event ID "1002" in the second row indicates a transition of device 2 from OFF to ON. The annotation for the second row explains that event ID "1002" is intended to bring a backup generator ("52U1") online in case of a main power outage, and so forth.

Figure 10B:
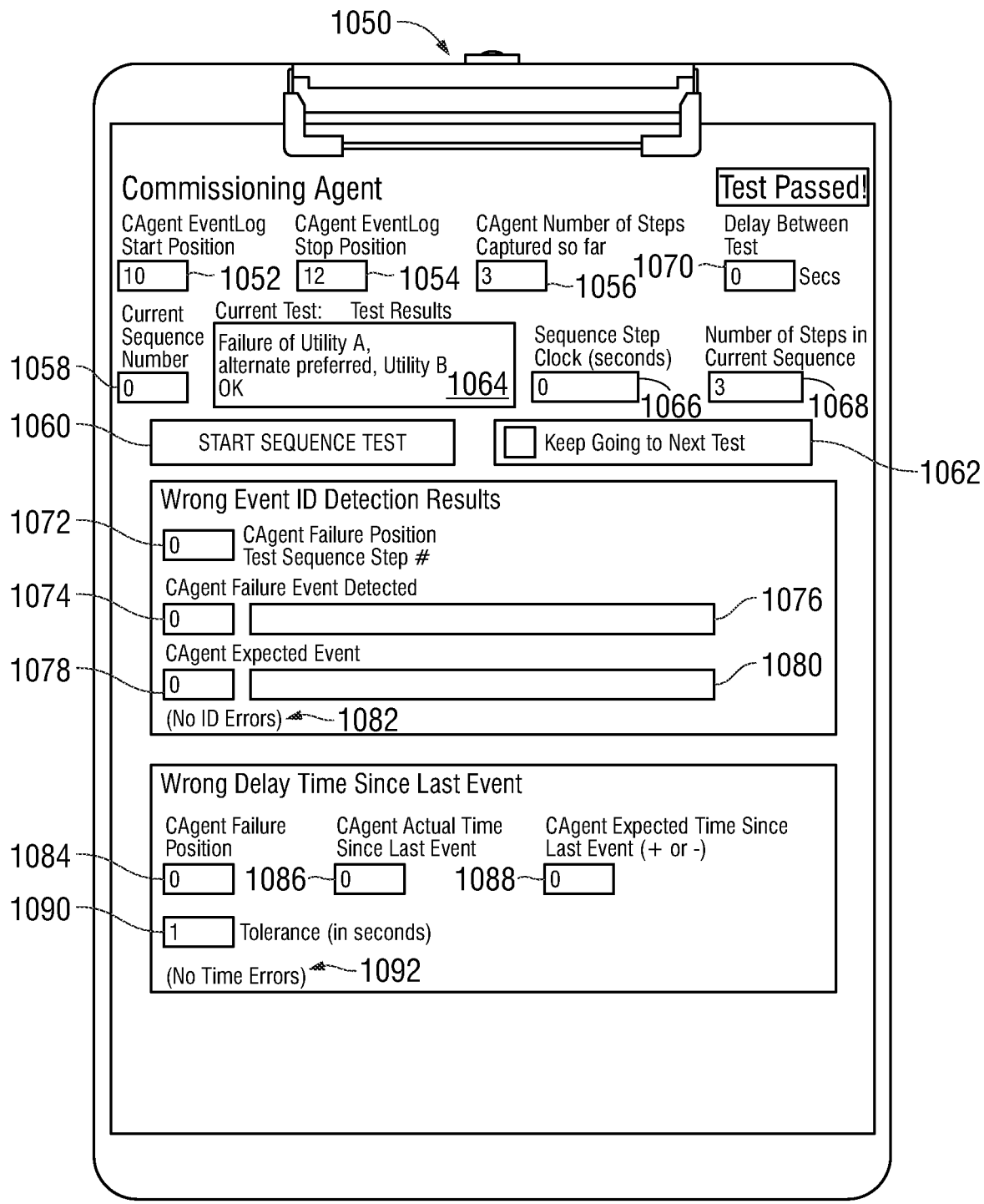

FIGS. 10A-10B are an alternative event log 1000 and alternative verification tool user interface 1050 for the commissioning agent 220 that use the annotations from the sequence table 900 in FIG. 9. The event log 1000 is similar to the event log 450 from FIG. 4B in that there is an event ID list 1002 containing the event IDs that were recorded (by the sequence of events recorder), and a row number list 1004 containing the row numbers where the event IDs were recorded (in the internal event table). Additionally, an annotations list 1006 provides users with annotations that briefly explain the event IDs in the event ID list 1002. In the current example, the annotations in the annotations list 1006 are taken or otherwise extracted from the sequence table 900 of FIG. 9. It is also possible in some embodiments for the annotations in the annotations list 1006 to be entered manually by the user as needed. Other features of the event log 1000 may include a date column 1008 containing the date stamps for when the event IDs were performed, and a time column 1010 containing the time stamps for when the event IDs took place. A Newest Row field 1012 may be added in some cases to indicate which row is the newest row in the log, to let the user know whether the log is in forward or reverse order.

The verification tool user interface 1050 is also similar to the verification tool user interface 400 from FIG. 4A, except that annotations are used in the user interface 1050. Also included in the user interface 1050 is an option for the user to automatically run multiple sequence automatically, one after another. As can be seen, there is a Start button 1052 and a Stop button 1054 that capture the start and stop positions for each sequence (as recorded in the internal event table). A Steps Captured So Far button 1056 shows the current number of steps captured for each sequence. A Sequence Number field 1058 allows the user to choose a specific sequence to run by entering the sequence number for that sequence. Pressing a Start Sequence Test button 1060 causes the user interface 1050 to automatically run the selected sequence. Selecting a Keep Going to Next option 1062 causes the user interface 1050 to automatically run the next sequence after the current sequence has completed and any additional sequences that may be available in the switchgear controller.

In some embodiments, for a given sequence, the comparison of the steps that were actually performed against the expected steps in a corresponding sequence table may be done in real time (via the verification logic 224), on a step-by-step basis as each step in the sequence is performed. In such embodiments, a Test Results field 1064 displays any annotations associated with each step in the sequence (from sequence table 900) as the step is performed. A Sequence Step Clock 1066 shows the elapsed time (in seconds) for the current step since the previous step, and a Number of Steps in Current Sequence field 1068 shows the total number of steps in the current sequence. A Delay Between Test field 1070 allows the user to set a time delay (in seconds) between consecutive sequences.

The above multi-PCS, real-time verification embodiment is also implemented via the event log 1000 of FIG. 10A. Here, rather than display the steps for one sequence at a time, the log maintains a rolling window of, for example, 10 to 15 steps that can span two or more sequences. When the commissioning agent starts a new sequence, the event log 1000 green-lights or otherwise highlights each step for that sequence one at a time to indicate performance of that step. When a sequence is completed, the event log 1000 removes the highlighting from the steps for that sequence, and begins green-lighting each step of the next sequence, and so forth. This can be seen in FIG. 10A where the green-lighting or highlighting on rows 10, 11, and 12 indicate that the first three steps of a new sequence were performed (successfully) at these rows, while highlighting was removed from the preceding rows.

Referring to FIG. 10B again, when a wrong event ID is detected in the steps of a sequence, the user interface 1050 reports the position of that error in a Failure Position Test Sequence Step field 1072. The failed event ID is reported in a Failure Event Detected field 1074 and any annotation associated with that event ID is displayed in an associated annotations field 1076. The expected event ID is reported in an Expected Event field 1078 and any annotations associated with that event ID is displayed in an associated annotations field 1080. An error message 1082 is displayed that summarizes the event ID failure for the user.

Similarly, when a wrong delay time is detected in the steps of a sequence, the user interface 1050 reports the position of that failure in a Failure Position field 1084. The actual delay time is reported in an Actual Time Since Last Event field 1086, and the expected delay time is reported in an Expected Time Since Last Event field 1088. Timing tolerance may be set (e.g., in seconds) by the user in a Tolerance field 1090, and an error message 1092 is displayed that summarizes the timing delay failure.

Figure 11B:
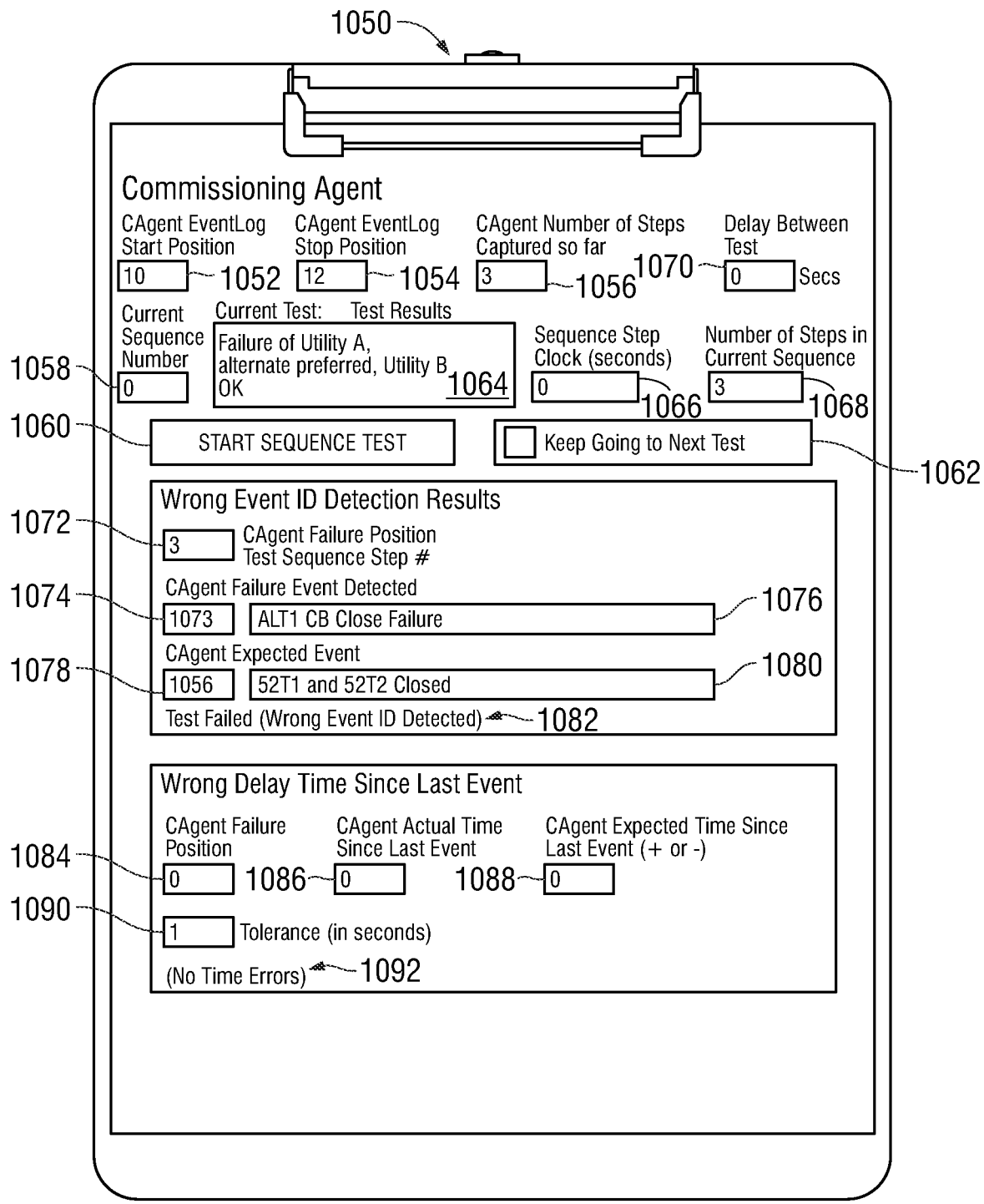

FIGS. 11A-11B illustrate the same alternative event log 1000 and verification tool user interface 1050, but where an event ID failure has been assumed for illustrative purposes. In this example, the wrong event ID was detected in the third step of the current sequence at row 18. The event log 1000 accordingly red-lights or otherwise flags the incorrect event ID and continues with the next step. The user interface 1050 similarly reports the position of the event ID failure (i.e., step 3) in the Failure Position Test Sequence Step field 1072. The detected event ID is reported in the Failure Event Detected field 1074 and any associated annotation is displayed in an associated annotation field 1076. The expected event ID is reported in the Expected Event field 1078 and any associated annotations is displayed in an associated annotation field 1080. The user interface 1050 also displays a summary error message at 1082.

Thus far, specific embodiments of the present disclosure have been described. Following now is a general method that may be used with embodiments of the present disclosure.

Figure 12:
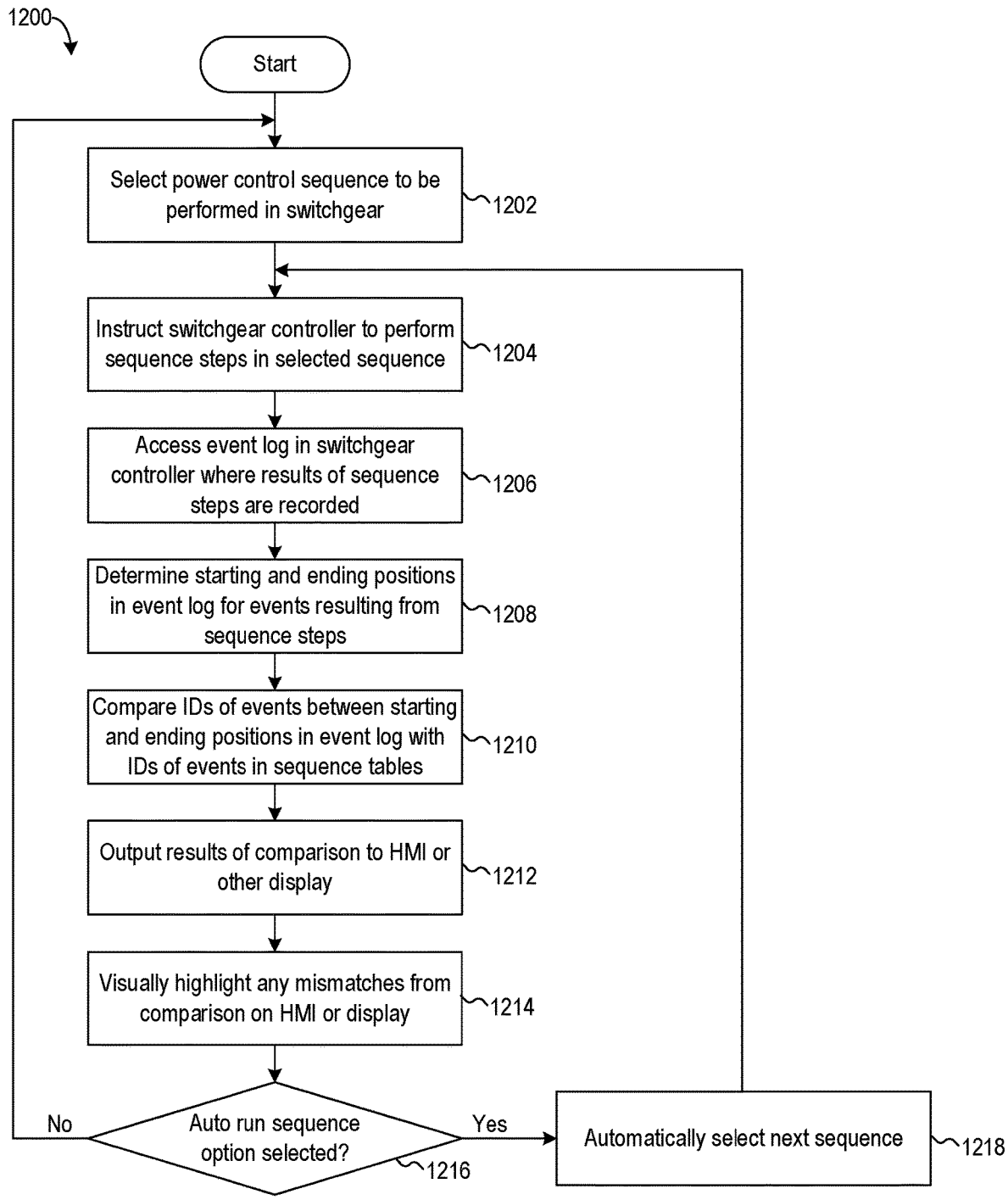
FIG. 12 is a flow diagram illustrating a method of verifying a power control sequence according to embodiments of this disclosure.

Referring to FIG. 12, a flow diagram of an exemplary method 1200 is shown that may be used with various embodiments of the commissioning agent disclosed herein. The method generally begins at 1202 where a power control sequence to be performed in a switchgear is selected. The selection of the power control sequence may be made automatically by programming residing in a switchgear controller, or it may be made manually by user-entry of a sequence number for the sequence using the commissioning agent. At 1204, the commissioning agent instructs the switchgear controller to perform the sequence steps in the selected sequence. This may be done, for example, by the commissioning agent issuing, or causing to be issued, an appropriate command to the switchgear controller. The switchgear controller then looks up the selected sequence in one or more sequence tables, typically stored at a designated storage location or memory block in the switchgear controller, and obtains the steps to be performed for the selected sequence.

At 1206, the commissioning agent reads or otherwise accesses an event log in the switchgear controller where the results of performing the steps of the selected sequence are recorded. This event log may be in the form of an internal event table residing at a designated storage location or memory block in the switchgear controller. At 1208, the commissioning agent determines the starting and ending positions in the event log for events corresponding to the steps in the selected sequence. This may be done either by capturing the starting and ending row numbers in the internal event table for events resulting from or corresponding to the steps in the selected sequence, or by capturing the starting row number and calculating the ending row number from the total number of steps in the sequence as set out in the sequence tables.

At 1210, the commissioning agent compares the IDs of the events between the starting and ending row numbers in the event log with the event IDs specified in the sequence tables. As mentioned earlier, this may be done on a step-by-step basis in real time as each sequence step is performed, or may be done on all event IDs together after the sequence has completed. At 1212, the commissioning agent outputs or otherwise presents the results of the comparison to an HMI or other type of display. This may involve presenting, for example, some or all of the sequence information in the exemplary user interface and/or event logs depicted herein. At 1214, the commissioning agent visually highlights any mismatches resulting from the comparison in 1212. This may be done, for example, by red-lighting an appropriate status indicator.

At 1216, the commissioning agent determines whether it should run another sequence, for example, by checking a user selected option to keep running sequences automatically. If the determination is yes, then the commissioning agent automatically selects the next power control sequence at 1218 and returns to 1204 to begin performing the next sequence. If the determination is no, then the commissioning agent returns to 1202 and waits for the next power control sequence to be selected, then repeats the method described above.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for controlling a switchgear, the system comprising:
   a human machine interface (HMI); and
   a processor coupled to the HMI, the processor operable to cause a switchgear controller of the switchgear to:
   perform a power control sequence having a plurality of sequence steps in the switchgear, the plurality of sequence steps including sequential transitions of at least two circuit switching devices in the switchgear, and record events resulting from the plurality of sequence steps in an event log;
   determine a starting position and an ending position in the event log where the events resulting from the plurality of sequence steps were recorded; and
   visually highlight, on the HMI, an event mismatch associated with the events recorded between the starting position and the ending position in the event log against events in the plurality of sequence steps.

2. The system of claim 1, wherein the processor is further operable to cause the switchgear controller of the switchgear to perform a verification of the events recorded between the starting position and the ending position in the event log against events in the plurality of sequence steps, and wherein any event mismatch identified by the verification are visually highlighted on the HMI.

3. The system of claim 2, wherein the processor causes the switchgear controller to perform the verification after the switchgear controller completes performance of the plurality of sequence steps of the power control sequence.

4. The system of claim 2, wherein the processor causes the switchgear controller to perform the verification on a step-by-step basis as the switchgear controller completes each sequence step of the plurality of sequence steps.

5. The system of claim 1, wherein the processor is further operable to cause the HMI to display an actual event and an expected event that caused the event mismatch.

6. The system of claim 1, wherein the processor is further operable to cause the HMI to display a position in the event log where the event mismatch occurred for the event mismatch.

7. The system of claim 1, wherein the sequence steps are defined in at least one sequence table that specifies a timing delay for at least one sequence step, and wherein the processor is further operable to cause the switchgear controller to perform a verification that the timing delay specified by the at least one sequence table was performed by the switchgear controller for the at least one sequence step.

8. A method of verifying performance of a power control sequence in a switchgear, comprising:
   instructing a switchgear controller to perform a power control sequence having a plurality of sequence steps in the switchgear, the plurality of sequence steps including sequential transitions of at least two circuit switching devices in the switchgear, the switchgear controller recording events resulting from the plurality of sequence steps in an event log;
   determining a starting position and an ending position in the event log where the events resulting from the plurality of sequence steps were recorded; and
   visually highlighting, on a display, an event mismatch associated with the events recorded between the starting position and the ending position in the event log against events in the plurality of sequence steps.

9. The method of claim 8, further comprising performing a verification of the events recorded between the starting position and the ending position in the event log against events in the plurality of sequence step, wherein any event mismatch identified by the verification are visually highlighted on the display.

10. The method of claim 9, wherein the verification is performed after the switchgear controller completes performance of the plurality of sequence steps of the power control sequence.

11. The method of claim 9, wherein the verification is performed on a step-by-step basis as the switchgear controller completes each sequence step of the plurality of sequence steps.

12. The method of claim 8, further comprising displaying on the display an actual event and an expected event that caused the event mismatch.

13. The method of claim 8, further comprising displaying on the display a position in the event log where the event mismatch occurred.

14. The method of claim 8, wherein the sequence steps are defined in at least one sequence table that specifies a timing delay for at least one sequence step, further comprising performing a verification that the timing delay specified by the at least one sequence table was performed by the switchgear controller for the at least one sequence step.

15. A non-transitory computer-readable medium storing program code for controlling a switchgear, the program code, when executed by a processor, causes a switchgear controller of the switchgear to:
   perform a power control sequence having a plurality of sequence steps in the switchgear, the plurality of sequence steps including sequential transitions of at least two circuit switching devices in the switchgear;
   record events resulting from the plurality of sequence steps in an event log;
   determine a starting position and an ending position in the event log where the events resulting from the plurality of sequence steps were recorded; and
   visually highlight, on a display, an event mismatch associated with the events recorded between the starting position and the ending position in the event log against events in the plurality of sequence steps.

16. The non-transitory computer-readable medium of claim 15, the program code, when executed by a processor, further causes a switchgear controller of the switchgear to perform a verification of the events recorded between the starting position and the ending position in the event log against events in the plurality of sequence steps, wherein any event mismatch identified by the verification are visually highlighted on the display.

17. The non-transitory computer-readable medium of claim 16, wherein the program code, when executed by the processor, further causes the switchgear controller to perform the verification after the completing performance of the plurality of sequence steps of the power control sequence.

18. The non-transitory computer-readable medium of claim 16, wherein the program code, when executed by the processor, further causes the switchgear controller to perform the verification on a step-by-step basis as each sequence step of the plurality of sequence steps is being completed.

19. The non-transitory computer-readable medium of claim 15, wherein the program code, when executed by the processor, further causes the display to display an actual event and an expected event that caused the event mismatch.

20. The non-transitory computer-readable medium of claim 15, wherein the program code, when executed by the processor, further causes the display to display a position in the event log where the event mismatch occurred for the event mismatch.

* * * * *